United States Patent
Ghodrati

(10) Patent No.: US 9,482,589 B2
(45) Date of Patent: Nov. 1, 2016

(54) LEAK DETECTOR FOR USE WITH FLANGED WASTE WATER DRAIN PIPE

(71) Applicant: Mahdi Ghodrati, Stone Creek (CA)

(72) Inventor: Mahdi Ghodrati, Stone Creek (CA)

( * ) Notice: Subject to any disclaimer, the term of this patent is extended or adjusted under 35 U.S.C. 154(b) by 141 days.

(21) Appl. No.: 14/128,974

(22) PCT Filed: Oct. 10, 2012

(86) PCT No.: PCT/CA2012/050714
§ 371 (c)(1),
(2) Date: Dec. 23, 2013

(87) PCT Pub. No.: WO2013/053059
PCT Pub. Date: Apr. 18, 2013

(65) Prior Publication Data
US 2014/0208831 A1    Jul. 31, 2014

Related U.S. Application Data

(60) Provisional application No. 61/627,263, filed on Oct. 11, 2011.

(51) Int. Cl.
*G01M 3/08* (2006.01)
*G01M 3/04* (2006.01)

(52) U.S. Cl.
CPC ............... *G01M 3/04* (2013.01); *G01M 3/042* (2013.01)

(58) Field of Classification Search
CPC .. G01M 3/2869; G01M 3/26; G01M 3/2876; G01M 3/04; B29C 66/71; F16L 2201/30
USPC ............................................................. 73/46
See application file for complete search history.

(56) References Cited

U.S. PATENT DOCUMENTS 3,485,085 A    12/1969   Hawkins
5,461,904 A *  10/1995   Baker .................. F16L 23/167
                                                 277/320

(Continued)

FOREIGN PATENT DOCUMENTS

GB          2270767 A       3/1994
JP       H07294367 A      11/1995

(Continued)

OTHER PUBLICATIONS

International Search Report dated Jan. 30, 2013 for International Application No. PCT/CA2012/050714.

*Primary Examiner* — Eric S McCall
*Assistant Examiner* — Mohammed E Keramet-Amircola
(74) *Attorney, Agent, or Firm* — Knobbe, Martens Olson & Bear, LLP

(57) ABSTRACT

Provided herein is a leak detector comprising: a flat base sheet bound by an outer perimeter and an interior aperture; a wick material barrier coupled to the base between the aperture and the outer perimeter in a continuous or substantially continuous strip around the aperture, the wick material barrier interrupted by one or more gap regions, each gap region defined by a pair of wick material projections starting at either end of the gap region and extending radially outward; a liquid sensor in fluid communication with the pair of wick material projections; and a liquid-impermeable material coupled to the base sheet and surrounding the pair of wick material projections to form a liquid-impermeable enclosure defining an interior cavity comprising the pair of wick material projections and the liquid sensor.

21 Claims, 12 Drawing Sheets

(56) References Cited

U.S. PATENT DOCUMENTS

| | | |
|---|---|---|
| 6,128,947 A | 10/2000 | Anderson |
| 2005/0160963 A1* | 7/2005 | Siikaluoma ............ G01M 3/042 116/206 |
| 2009/0127848 A1* | 5/2009 | Carns .................... F16L 23/003 285/55 |
| 2011/0209278 A1* | 9/2011 | Hatt ........................ E03D 11/16 4/252.5 |

FOREIGN PATENT DOCUMENTS

| | | |
|---|---|---|
| JP | 2007218884 A | 8/2007 |
| JP | 2008128666 A | 6/2008 |
| JP | 2008163661 A | 7/2008 |

* cited by examiner

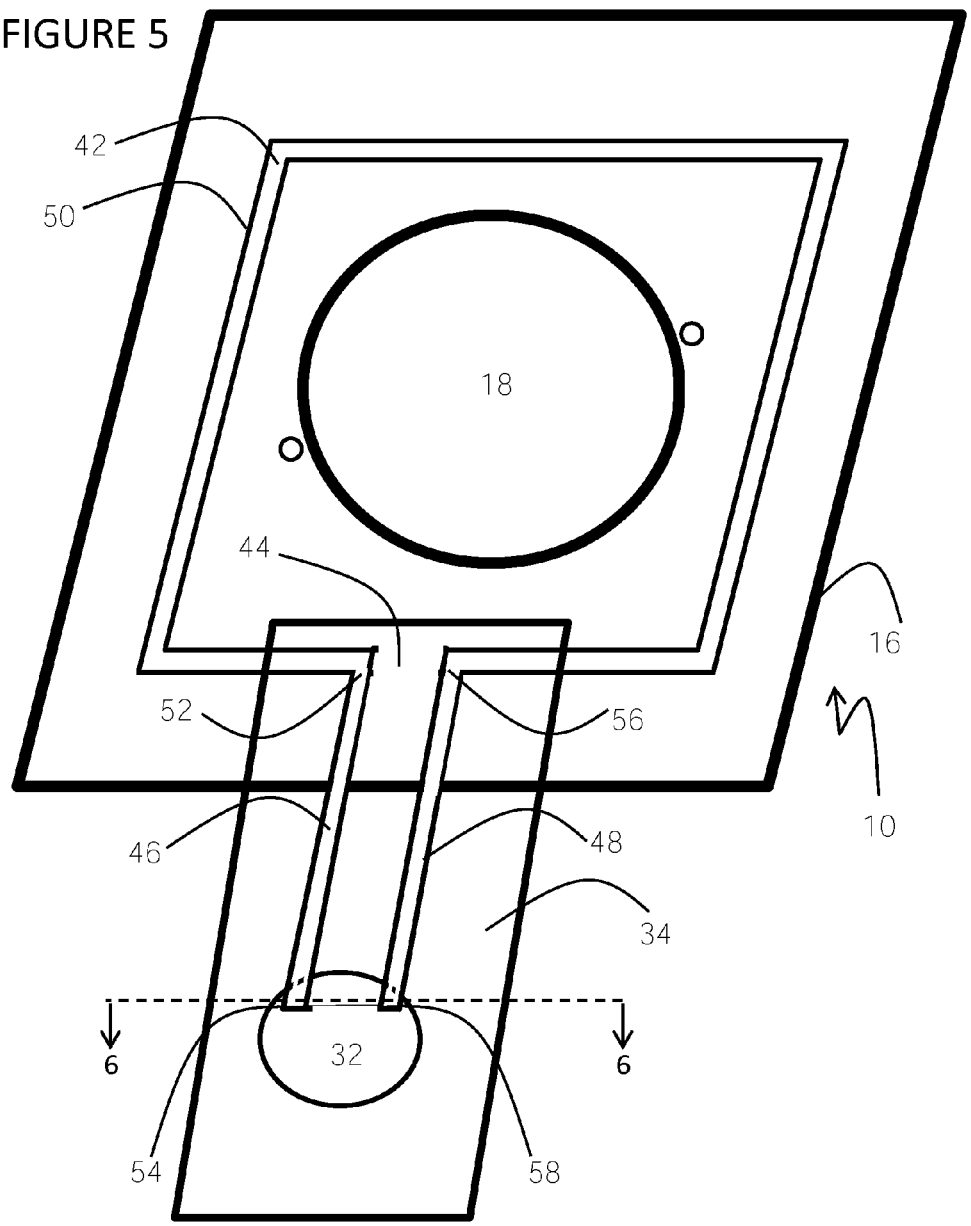
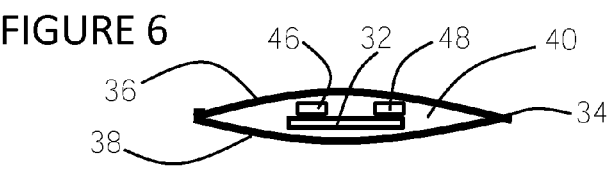

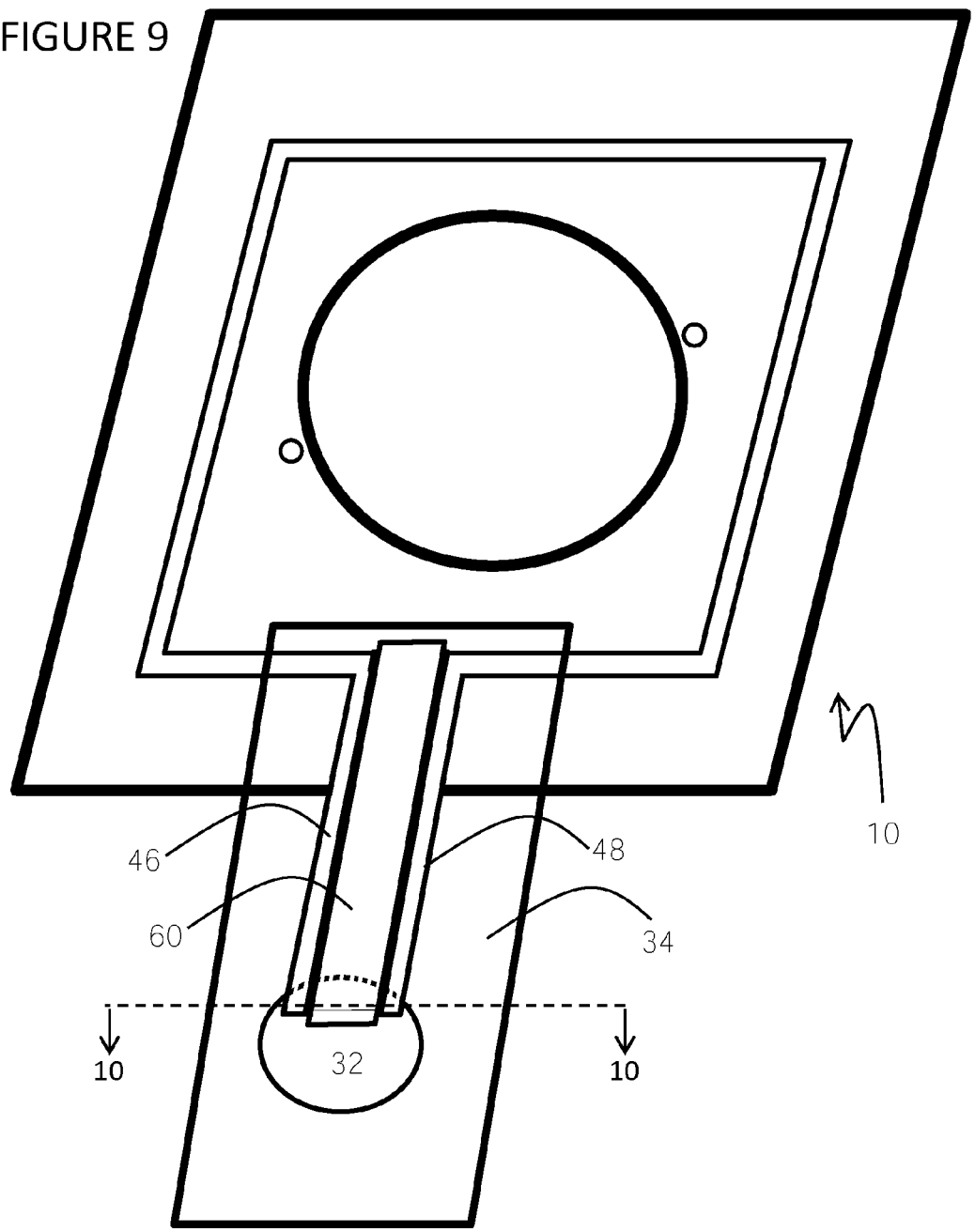
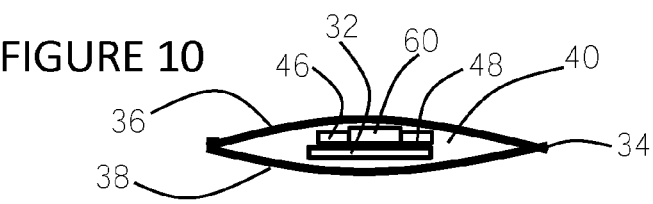

LEAK DETECTOR FOR USE WITH FLANGED WASTE WATER DRAIN PIPE

CROSS REFERENCE TO RELATED APPLICATIONS

This application is the U.S. National Phase of International Application No. PCT/CA2012/050714, filed Oct. 10, 2012, designating the U.S. and published as WO 2013/053059 on Apr. 18, 2013 which claims the benefit of U.S. Provisional Application No. 61/627263 filed Oct. 11, 2011.

BACKGROUND OF THE INVENTION

1. Field of the Invention

The present invention relates to a leak detector for a pipe connection, and more particularly a leak detector for a pipe connection in a visually obstructed location.

2. Description of the Related Art

Seal integrity between adjacent flanged pipes is of primary importance in a fluid filled system. A seal is typically maintained by a gasket retained in position inside the flange bolting.

A gasket used to seal adjacent pipes is subject to warping and damaging stresses. It may be exposed to temperature extremes or the corrosive effects of the fluid within the pipe. Such conditions promote deterioration of the material of the gasket and can lead to failure of the seal with subsequent leakage of the fluid from the pipe to the exterior. Leakage can occur at any point around the circumference of the pipe joint. The leaking fluid will thus contaminate the bolts of the flange joint and may, depending upon its properties, corrode the structure of the pipe joint itself.

Thus, it is important that any leakage is detected, contained and repaired quickly. Early detection of leaks avoids more serious problems caused to the pipe structures and surroundings that may occur if leaks remain undetected until a relatively late stage.

Leaks from pipe connections in residential and commercial properties is a significant source of property damage. Specifically, the piped connections to wastewater plumbing fixtures such as toilets, bathtubs, standing showers, sinks and the like, are often obstructed from view and leaks can go undetected until water seepage has caused structural damage such as floor deterioration and mold growth. An undetected leaks from a toilet drain pipe connection is a common problem.

In toilets waste water exits to a flanged drain pipe in a bathroom floor. Toilets are typically bolted to a flange mounted to the floor and coupled to the drain pipe. Toilet installations can include a gasket, usually a wax or rubber ring, disposed between the drain pipe and the toilet to produce a liquid-tight seal between the drain pipe and the toilet. For example, a wax ring can be coupled to the discharge outlet portion of the toilet by pressing the wax ring onto the discharge outlet portion, thereby deforming the wax ring to the contour of the discharge outlet portion. The toilet is then set on the flange such that the wax ring is axially aligned with the flange. Applying downward pressure on the toilet causes the wax ring to press onto the flange, thereby deforming the wax ring to the contour of the flange to produce the seal between the drain pipe and the discharge outlet portion of the toilet. A similar sealing process may be accomplished with a rubber ring or other types of gaskets.

A leak through the gasket seal can go undetected as the seal is obstructed from visual inspection by the toilet structure, typically the toilet base. A slow leak often does not extend a pool of water on the floor surface where the water may be detected by visual inspection. Rather a slow leak often allows water to seep into or under the floor deteriorating the floor structure and/or the ceiling structure underneath the floor. Water damage and mold growth in a ceiling underneath a toilet can be the first sign of a leak in the gasket seal.

Various leak detectors have been developed to address the problem of leaks in piping connections that are in visually obstructed locations such as a toilet seal with a drain pipe. Examples of such leak detectors are disclosed in the following patent documents: JP2008128666(A) by Shimura et al, JP7294367(A) Higuchi et al, JP2008163661(A) by Maruyama et al, JP2007218884(A) by Hiraide et al, U.S. Pat. No. 6,128,947 by Anderson, US2005160963(A1) by Siikaluoma et al, U.S. Pat. No. 3,485,085 by Hawkins, U.S. Pat. No. 5,461,904 by Baker, and US20110209278(A1) by Hatt. However, none of these leak detectors have achieved common acceptance.

Furthermore, most existing leak detectors are susceptible to yielding a false positive or a false negative signal. A false positive signal occurs when a detected liquid is an exogenous liquid and not the target liquid flowing through a piped connection. For example, when liquids are used to wash structures or surfaces proximal to a piped connection, a signal due to the washings would be a false positive signal. A false negative signal can arise when a leak is sufficiently slow that the liquid evaporates prior to contacting a liquid sensor in a leak detector.

Accordingly, there is a continuing need for alternative leak detectors for piping connections in visually obstructed locations where leaks cannot be readily determined by visual inspection.

SUMMARY OF THE INVENTION

In an aspect there is provided a leak detector for installation between a gasket and a flange of a flanged drain pipe connection of a wastewater plumbing fixture comprising:
a flat base sheet bound by opposing first and second surfaces and an outer perimeter, the base defining an aperture sized to be approximately equal to the radial cross-sectional area of the drain pipe;
a wick material barrier coupled to the base between the aperture and the outer perimeter in a substantially continuous strip around the aperture, the wick material barrier interrupted by one or more gap regions, each gap region defined by a pair of wick material projections starting at either end of the gap region and extending radially outward;
a liquid sensor in fluid communication with the pair of wick material projections; and
a water-impermeable material coupled to the base sheet and surrounding the pair of wick material projections to form a water-impermeable enclosure defining an interior cavity comprising the pair of wick material projections and the liquid sensor.

In another aspect there is provided a leak detector for installation between a gasket and a flange of a flanged drain pipe connection of a wastewater plumbing fixture comprising:
a flat base sheet bound by opposing first and second surfaces and an outer perimeter, the base defining an aperture sized to be approximately equal to the radial cross-sectional area of the drain pipe;

a wick material barrier coupled to the base between the aperture and the outer perimeter in a substantially continuous strip around the aperture;
a wick material projection extending radially outward from the wick material barrier;
an absorbent material in fluid communication with the wick material projection, the absorbent material having an absorbent rate greater than the absorbent rate of the wick material projection; and
a water-impermeable material coupled to the base sheet and surrounding the wick material projection to form a water-impermeable enclosure defining an interior cavity comprising the wick material projection and the absorbent material.

In yet another aspect there is provided a leak detector comprising:
a flat base sheet bound by an outer perimeter and an interior aperture;
a wick material barrier coupled to the base between the aperture and the outer perimeter in a continuous or substantially continuous strip around the aperture, the wick material barrier interrupted by one or more gap regions, each gap region defined by a pair of wick material projections starting at either end of the gap region and extending radially outward;
a liquid sensor in fluid communication with the pair of wick material projections; and
a liquid-impermeable material coupled to the base sheet and surrounding the pair of wick material projections to form a liquid-impermeable enclosure defining an interior cavity comprising the pair of wick material projections and the liquid sensor.

In still another aspect there is provided a leak detector comprising:
a flat base sheet bound by an outer perimeter an interior aperture;
a wick material barrier coupled to the base between the aperture and the outer perimeter in a continuous or substantially continuous strip around the aperture;
a wick material projection extending radially outward from the wick material barrier;
an absorbent material in fluid communication with the wick material projection, the absorbent material having an absorbent rate greater than the absorbent rate of the wick material projection; and
a liquid-impermeable material coupled to the base sheet and surrounding the wick material projection to form a liquid-impermeable enclosure defining an interior cavity comprising the wick material projection and the absorbent material.

BRIEF DESCRIPTION OF THE DRAWINGS

FIG. 5 shows a top plan view of a variant of the leak detector shown in FIG. 1 with a liquid sensor in a resting first state;
FIG. 6 shows a cross-section view of the leak detector shown in FIG. 5 taken along line 6-6;
FIG. 9 shows a top plan view of a variant of the leak detector shown in FIG. 5 with a liquid sensor in a resting first state;
FIG. 10 shows a cross-section view of the leak detector shown in FIG. 9 taken along line 10-10.

DETAILED DESCRIPTION OF THE PREFERRED EMBODIMENT

Figure 1:
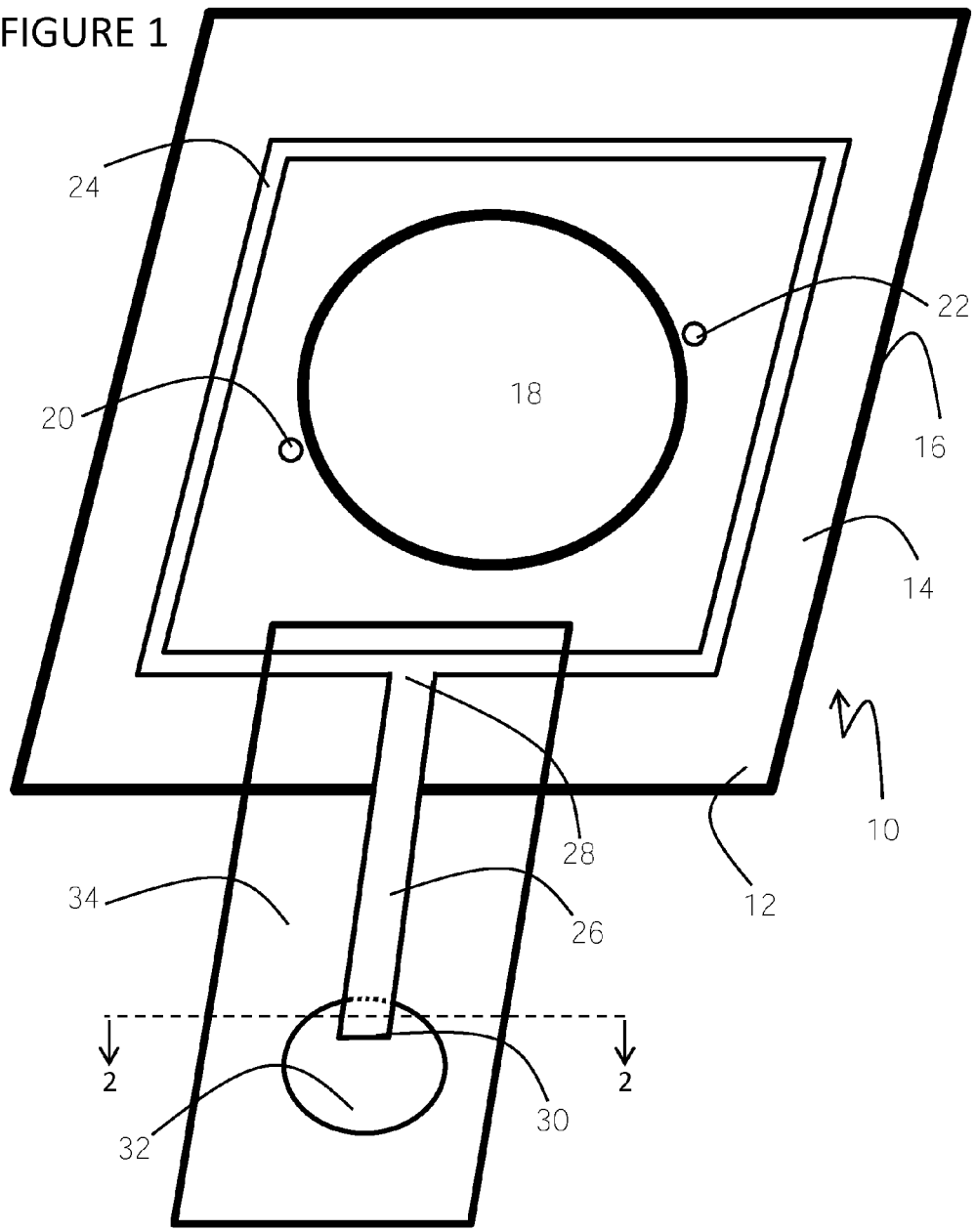
FIG. 1 shows a top plan view of a leak detector with a liquid sensor in a resting first state.

Referring to the drawings, FIG. 1 shows a top view of an example of a leak detector 10. that can be installed in a flanged pipe connection. The leak detector has the general shape of a pad comprising a flat base sheet 12 being bound by a first surface 14, a second surface (not shown), and an outer perimeter 16. The thickness of the base sheet defined as the distance between the first and second surfaces typically ranges from 0.1 millimeter to 3 mm. A first aperture 18 is located in a generally central portion of the sheet with the axial and radial directions of the first aperture defining the axial and radial directions of the leak detector. The first aperture size is related to the radial cross-sectional area or perimeter of the flange or the pipe in the flanged pipe connection. The first aperture is typically sized to be approximately equal to the radial cross-sectional area or perimeter of the flange or the outer pipe surface in the flanged pipe connection. Located proximal to the first aperture 18, second aperture 20 and third aperture 22 are sized for receiving bolts that secure a flanged pipe connection and are aligned or spaced from each other according to corresponding bolt holes in the flange (not shown).

A wick material located in between the first aperture 18 and the perimeter 16 of the base sheet is coupled to the base sheet typically using an adhesive that cannot be dissolved by the liquid intended to be carried through the flanged pipe connection and that does not occlude the pores of the wick material. The wick material has two portions, a barrier portion 24 and a projection portion 26. The wick material barrier 24 is coupled to the base sheet as a strip that runs continuously around the first aperture 18 so that the wick material forms a barrier that surrounds the first aperture. The wick material also forms a projection 26 extending radially outward towards and beyond the outer perimeter 16 of the base sheet and generally in the same plane as the base sheet. The wick material projection 26 has two ends, a first end 28 that is integral with or coupled to be in fluid communication with the wick material barrier 24 and a second end 30 located radially outward from the base sheet perimeter 16. The second end 30 contacts and is in fluid communication with a liquid sensor 32 that changes from a first color to a second color upon absorbing a target liquid. In FIG. 1 the liquid sensor is shown in its dry state displaying a first color indicating a lack of exposure to the target liquid.

The wick material projection 26 and the liquid sensor 32 are surrounded by a liquid-impermeable enclosure 34. The length of the liquid-impermeable enclosure is sufficient to enclose both the wick material projection 26 and the liquid sensor. The length of the wick material projection 26, the length of the liquid sensor 32, or the combined length of both is equal to or greater that the distance from the flanged pipe to the edge of the structure causing its visual obstruction.

Figure 2:
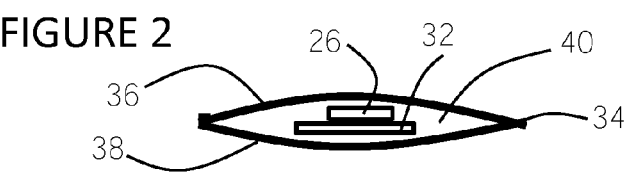
FIG. 2 shows a cross-section view of the leak detector shown in FIG. 1 taken along line 2-2.

FIG. 2 shows a cross-sectional view of the wick material projection 26, the liquid sensor 32 and the liquid-impermeable enclosure 34 taken along line 2-2 shown in FIG. 1. The liquid impermeable enclosure comprises a first sheet 36 and a second sheet 38 that are similarly sized and sealed along all their edges to form the liquid impermeable enclosure 34 and to define an interior cavity 40 that houses the wick material projection 26, the liquid sensor 32 and a volume capacity or reservoir for liquid. The first and second sheets 36, 38 are typically composed of a thermoplastic material. At least one of the first and second sheets is non-opaque (eg. transparent or semi-transparent) so that a color change of the liquid sensor can be readily determined by visual inspection.

Figure 3:
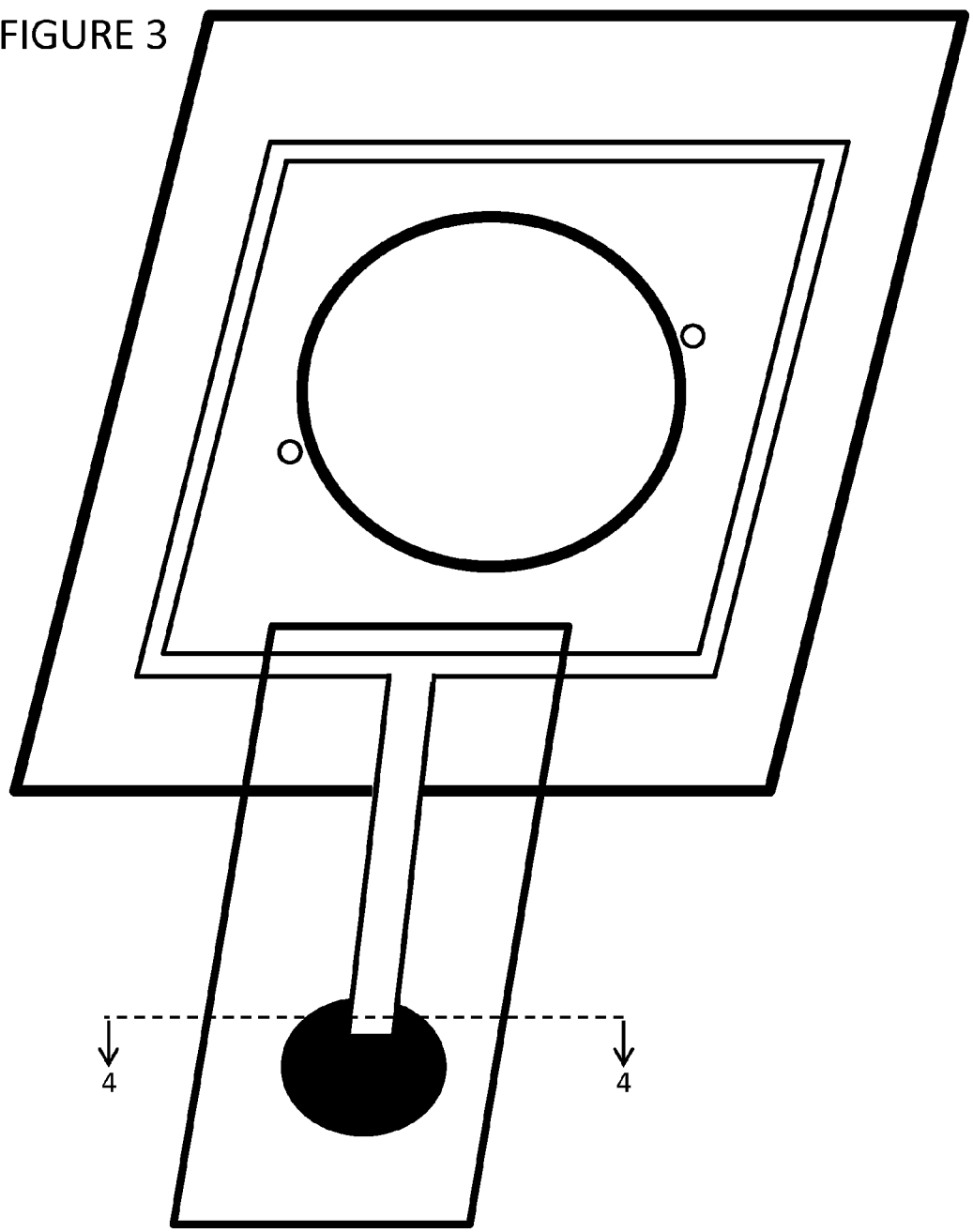
FIG. 3 shows a top plan view of the leak detector shown in FIG. 1 with the liquid sensor changed to an activated second state.
Figure 4:
FIG. 4 shows a cross-section view of the leak detector shown in FIG. 3 taken along line 4-4.

FIGS. 3 and 4 show the leak detector shown in FIGS. 1 and 2 with the liquid sensor changed to its second color after exposure to the target liquid.

FIGS. 5 and 6 shows the leak detector 10 shown in FIG. 1 modified to replace the continuous wick material barrier 24 with a wick material barrier 42 with a gap region 44 and to replace the wick material projection 26 with a pair of similarly sized wick material projections, a first wick material projection 46 and a second wick material projection 48. The wick material barrier 42 is coupled to the base sheet as a strip that runs continuously around the first aperture 18 so that the wick material forms a barrier that surrounds the first aperture except at gap region 44. The length of the gap region defined as the distance between the wick material barrier at either end of the gap region 44 is typically less than 10% of the total distance of the outer perimeter 50 of the wick material barrier 42. On either end of the gap region 44, the wick material forms a pair of substantially parallel wick material projections, the first wick material projection 46 and the second wick material projection 48, extending radially outward towards and beyond the outer perimeter 16 of the base sheet and generally in the same plane as the base sheet. Each of the first and second wick material projections 46 and 48 has two ends, a pair of first ends, 52 and 56 respectively, that are integral with or are coupled to be in fluid communication with the wick material barrier 42 and a pair of second ends, 54 and 58 respectively, located radially outward from the base sheet perimeter 16. The second ends, 54 and 58 respectively, contact and are in fluid communication with a liquid sensor 32 that changes from a first color to a second color upon absorbing a target liquid. In FIG. 5 the liquid sensor is shown in its dry state displaying a first color indicating a lack of exposure to the target liquid.

Figure 7:
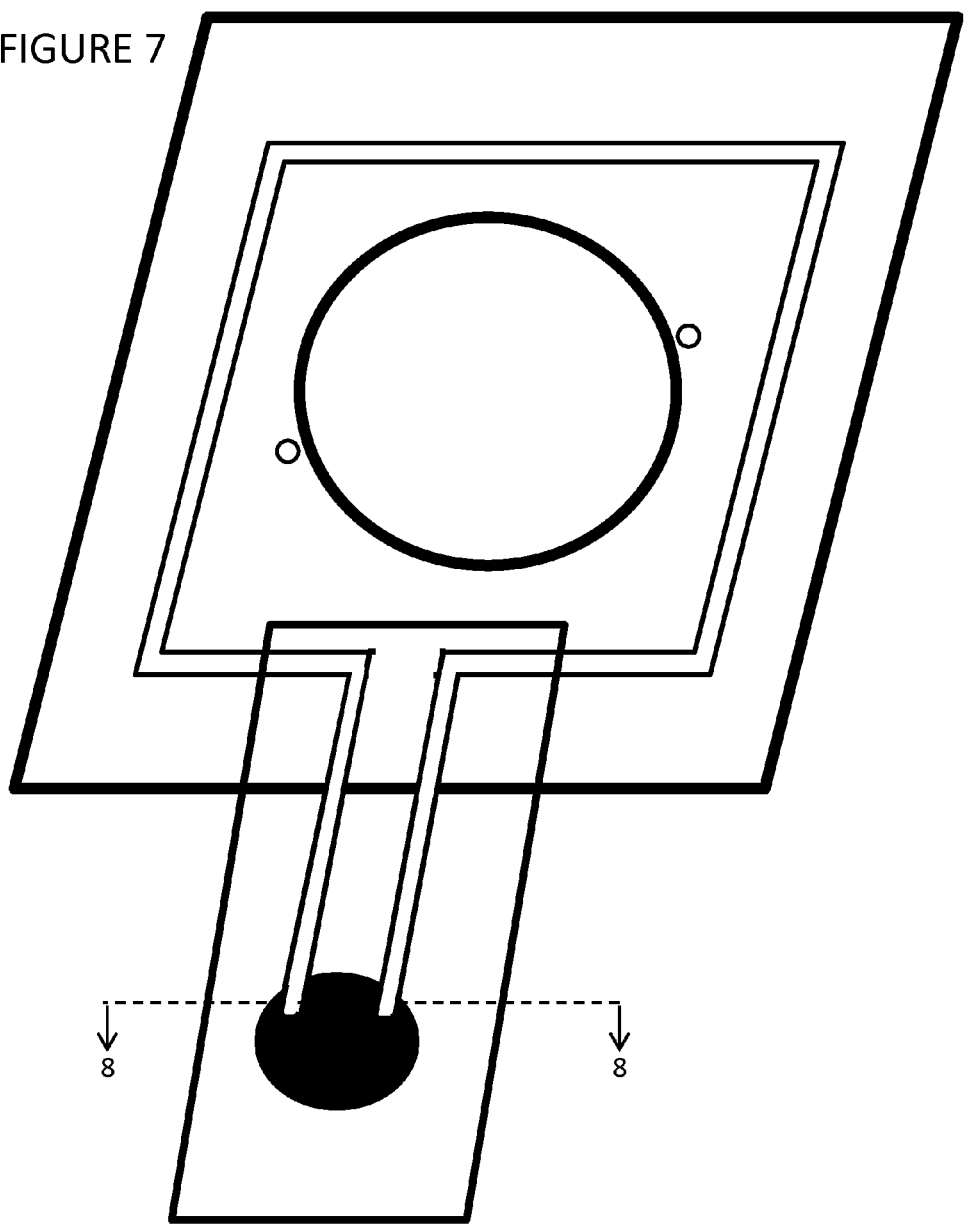
FIG. 7 shows a top plan view of the leak detector shown in FIG. 5 with the liquid sensor changed to an activated second state.
Figure 8:
FIG. 8 shows a cross-section view of the leak detector shown in FIG. 7 taken along line 8-8.

FIGS. 7 and 8 show the leak detector shown in FIGS. 5 and 6 with the liquid sensor changed to its second color after exposure to the target liquid.

The modification shown in FIGS. 5, 6, 7 and 8 provides the benefit of enhancing liquid flow to the wick material projections. Comparing FIG. 1 to FIG. 5, in FIG. 1 liquid flow through wick material barrier 24 has two competing paths approaching the first end 28 of wick material projection 26—each molecule of liquid can either continue to flow through the closed loop of wick material barrier 24 or can flow to wick material projection 26. In FIG. 5, liquid flow through the open loop of wick material barrier 42 has only a single path of flow towards wick material projections 46 and 48 as liquid flow approaches either one or both of first ends 52 and 56, respectively.

FIGS. 9 and 10 show the leak detector shown in FIG. 5 modified to place a strip of liquid-impermeable material between wick material projections 46 and 48. The length of liquid-impermeable strip 60 is substantially equal to the length of wick material projections 46 and 48. Wick material projections 46 and 48 each abut or are coupled to opposing sides of the liquid-impermeable strip 60. The liquid repellant action of the liquid-impermeable strip 60 can further enhance channeling of liquid flow along the wick material projections 46 and 48.

In FIGS. 9 and 10 the liquid sensor is shown in its dry state displaying a first color indicating a lack of exposure to the target liquid.

Figure 11:
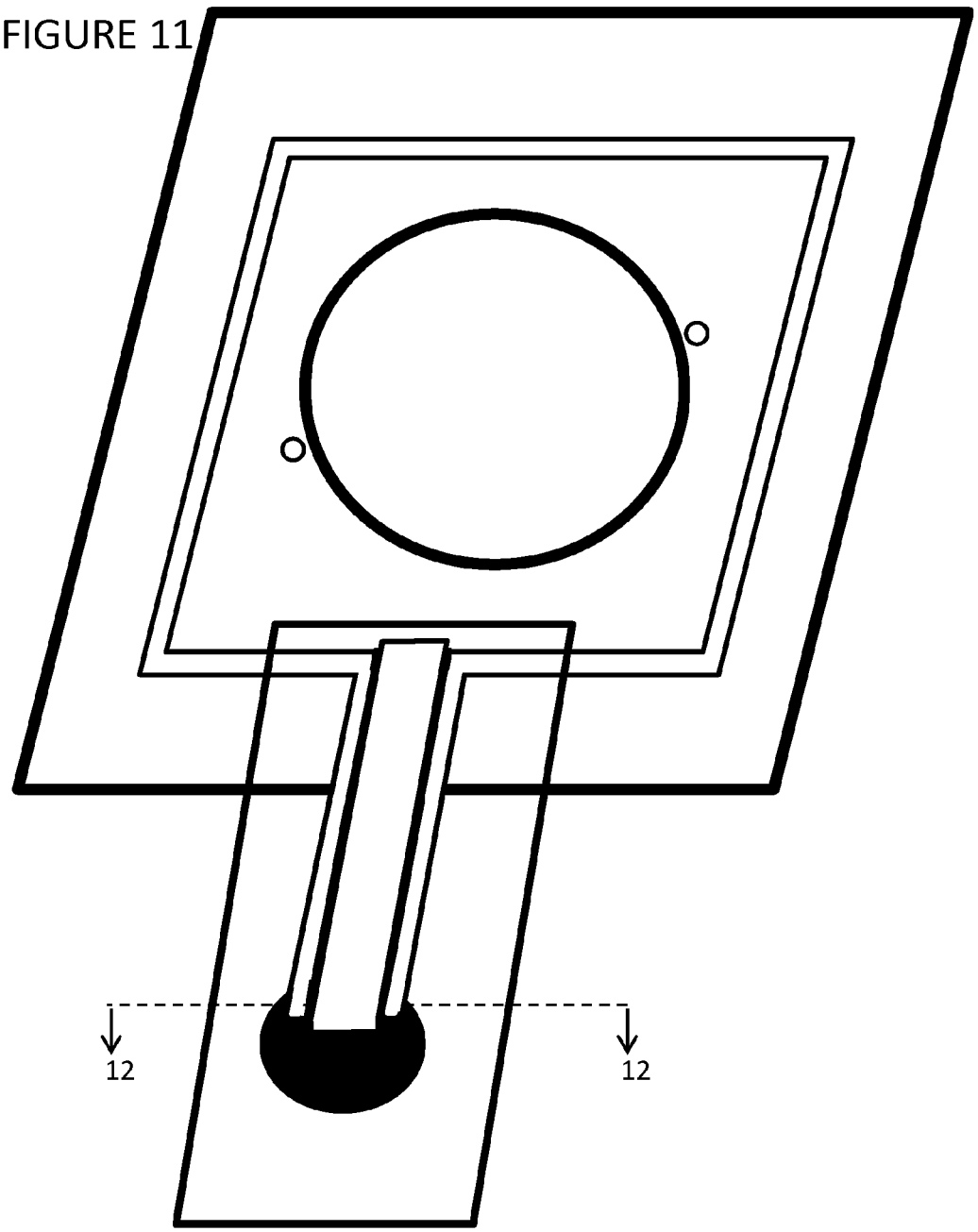
FIG. 11 shows a top plan view of the leak detector shown in FIG. 9 with the liquid sensor changed to an activated second state.
Figure 12:
FIG. 12 shows a cross-section view of the leak detector shown in FIG. 11 taken along line 11-11.

FIGS. 11 and 12 show the leak detector shown in FIGS. 9 and 10 with the liquid sensor changed to its second color after exposure to the target liquid.

Figure 13:
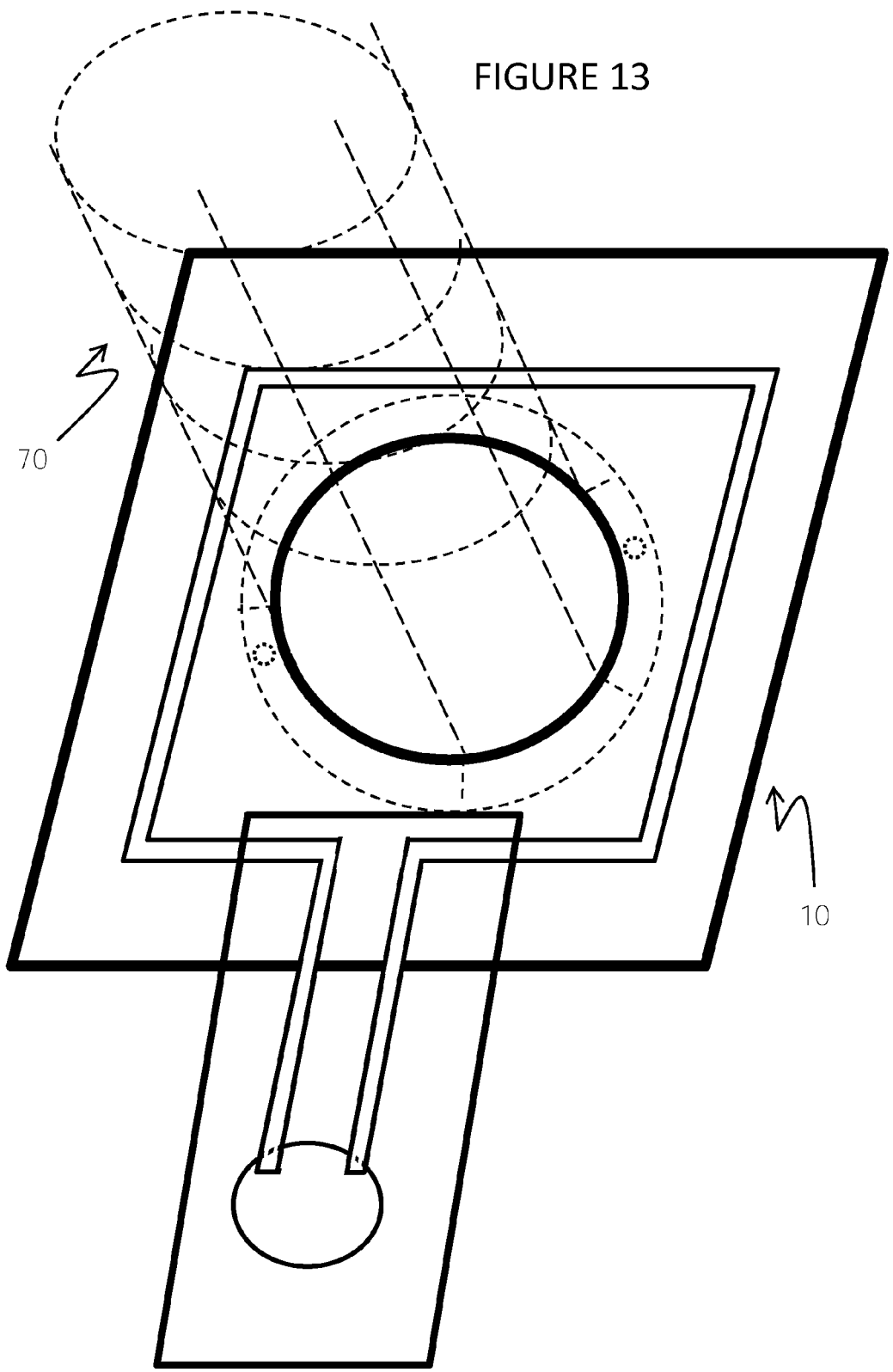
FIG. 13 shows the leak detector shown in FIG. 5 installed in a flanged pipe connection.

FIG. 13 shows the leak detector shown in FIG. 5 in use, installed between flanged pipe 70 and another pipe (not shown).

Figure 14:
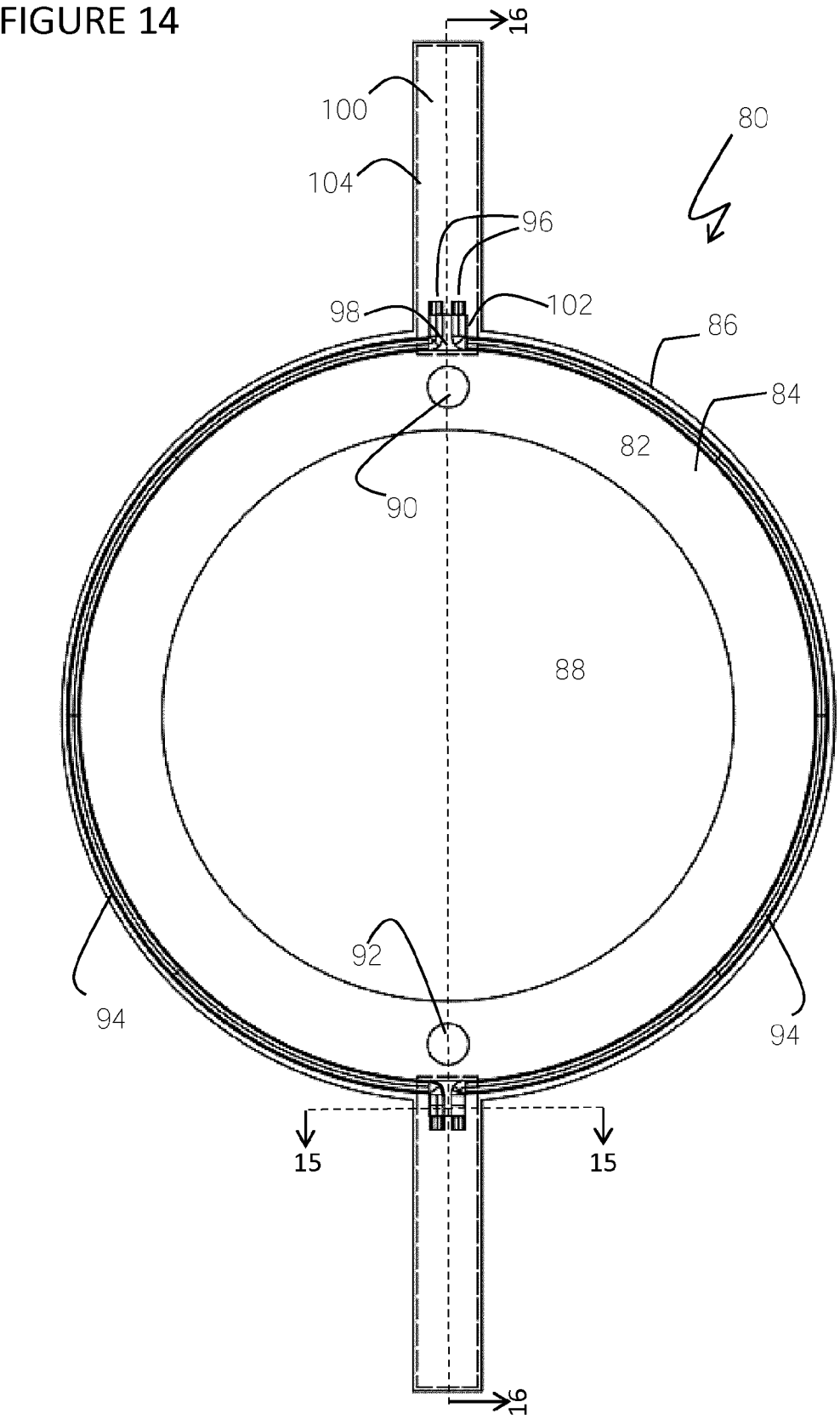
FIG. 14 shows a top plan view of another leak detector variant.

FIG. 14 shows a top view of an example of a leak detector 80. that can be installed in a flanged drain pipe connection with a toilet discharge outlet. The leak detector has the general shape of a pad comprising a flat base sheet 82 being bound by a first surface 84, a second surface (not shown), and an outer perimeter 86. The thickness of the base sheet defined as the distance between the first and second surfaces typically ranges from 0.1 millimeter to 3 mm. A first aperture 88 is located in a generally central portion of the sheet with the axial and radial directions of the first aperture defining the axial and radial directions of the leak detector. The first aperture size is related to the radial cross-sectional area or perimeter of the flange or the drain pipe. The first aperture is typically sized to be approximately equal to the radial cross-sectional area or perimeter of the flange or the outer surface of the drain pipe. Located proximal to the first aperture 88, second aperture 90 and third aperture 92 are sized for receiving bolts that secure a toilet to the flanged drain pipe and are aligned or spaced from each other according to corresponding bolt holes in the flange (not shown).

A wick material located in between the first aperture 88 and the perimeter 86 of the base sheet is coupled to the base sheet typically using an adhesive that cannot be dissolved by water and that does not occlude the pores of the wick material. The wick material has two types of orientations, a barrier orientation 94 and projection orientation 96. The wick material barrier 94 is coupled to the base sheet as a strip that runs continuously around the first aperture 88 so that the wick material forms a barrier that surrounds the first aperture except at gap regions 98. The length of the gap region defined as the distance between the wick material barrier at either end of the gap region 98 is typically less than 10% of the total distance of the outer perimeter 86 of the wick material barrier 94. On either end of each gap region 98, the wick material forms a pair of substantially parallel wick material projections, the first wick material projection 96a and the second wick material projection 96b, extending radially outward towards and beyond the outer perimeter 86 of the base sheet and generally in the same plane as the base sheet. Each of the first and second wick material projections 96a and 96b are integral with and are in fluid communication with the wick material barrier 94 and terminate at ends located radially outward from the base sheet perimeter 86.

Projection tabs 100 bound by first and second surfaces comprising a diffusible water soluble dye extend radially outward from the base sheet and define openings 102 aligned with the ends of each pair of wick material projections 96a,b. Each pair of wick material projections abuts a first side of projection tab 100, while absorbent napkin 104 abuts a second surface of the projection tab 100. Wick material projections 96a,b contact and are in fluid communication with absorbent napkin 104 through opening 102.

Projection tab 100 has a slower water absorbent rate than wick material projections 96, while absorbent napkin 104 has a higher absorbent rate than wick material projections 96. Accordingly water flowing through wick material projections 96 is preferentially absorbed by absorbent napkin 104 and the wet absorbent napkin 104 becomes colored by the transfer of diffusible dye from the projection tab 100 to the absorbent napkin 104.

Figure 15:
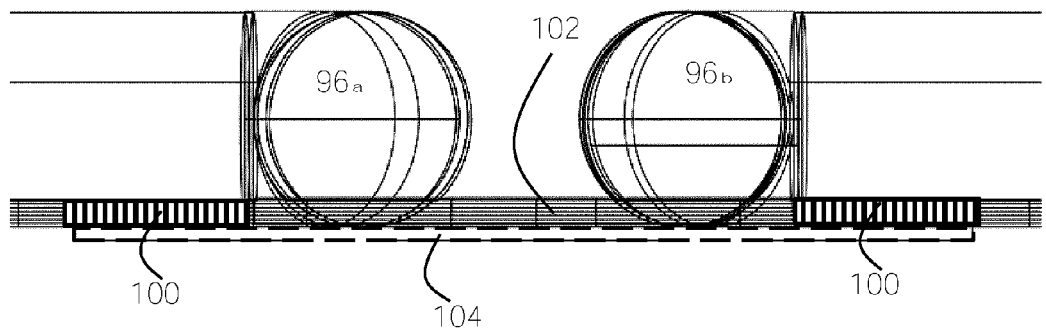
FIG. 15 shows a perspective cross-section view of the leak detector shown in FIG. 14 taken along line 15-15.
Figure 16:
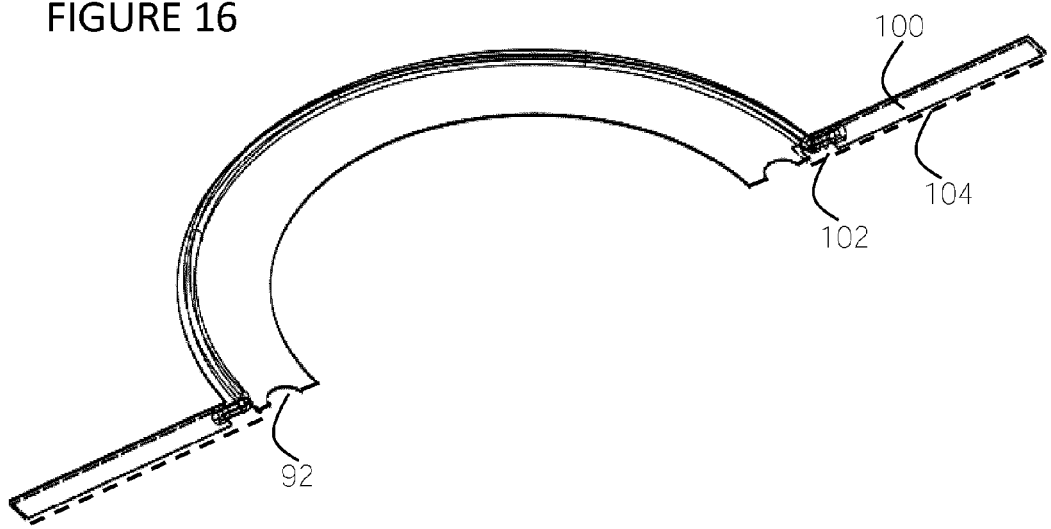
FIG. 16 shows a perspective cross-section view of the leak detector shown in FIG. 14 taken along line 16-16.
Figure 17:
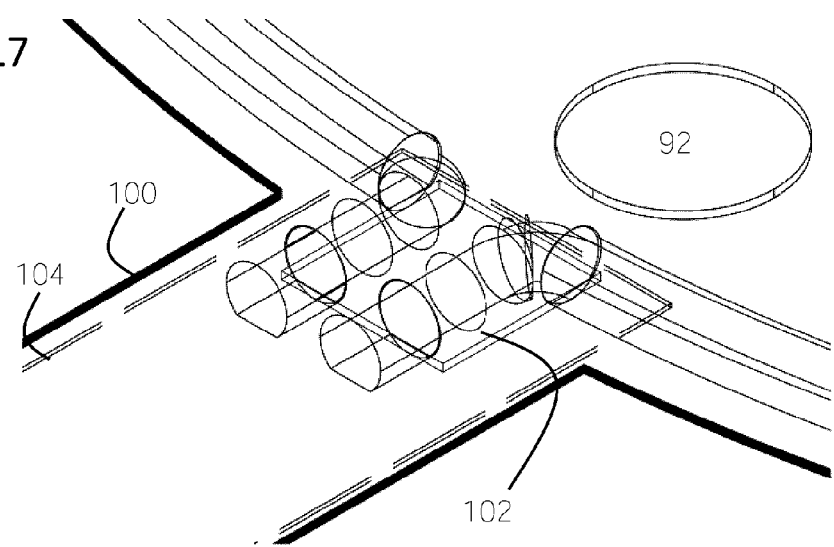
FIG. 17 shows a magnified perspective view of the region around line 15-15.
Figure 18:
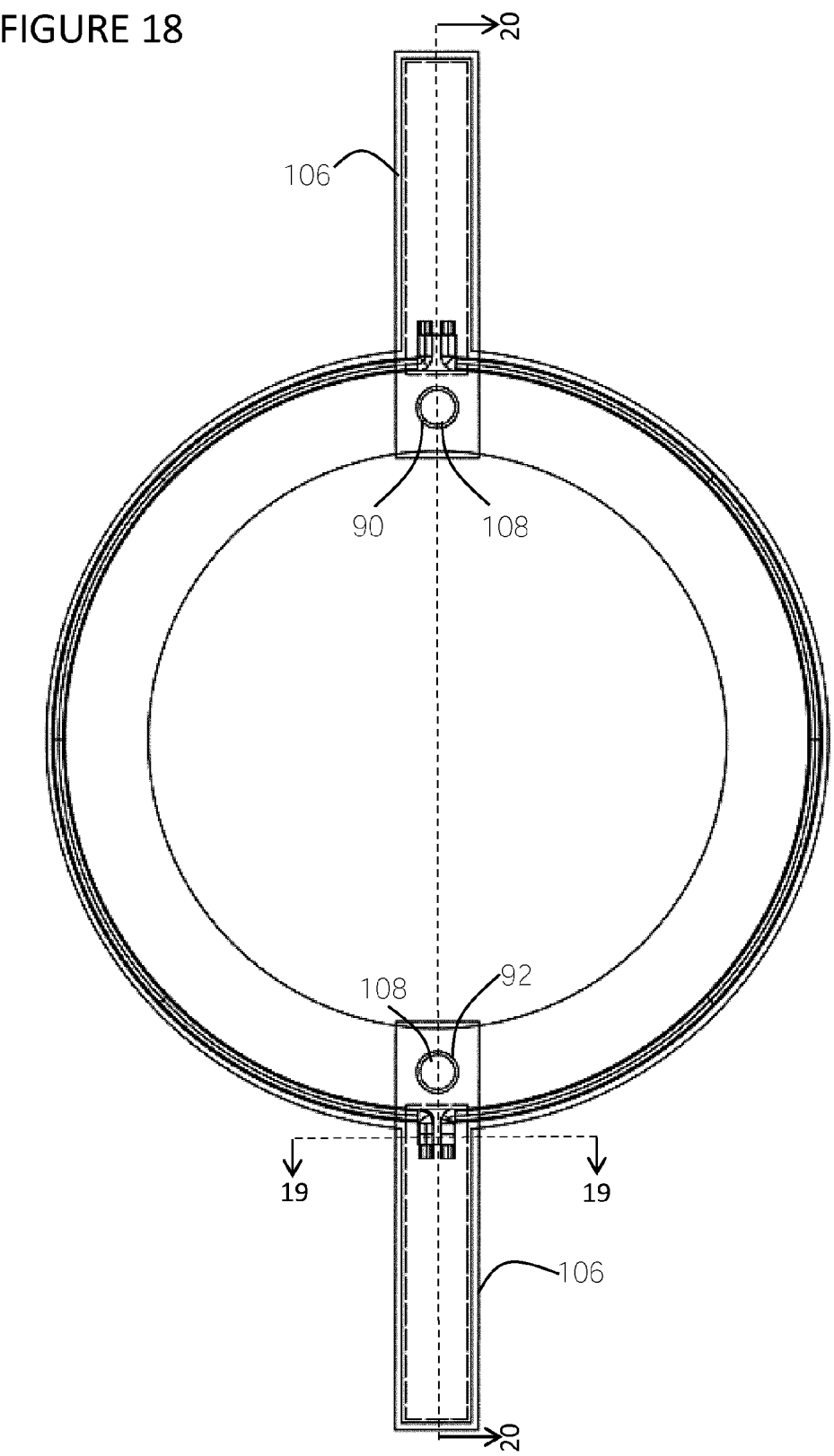
FIG. 18 shows a top plan view of the leak detector shown in FIG. 14 further comprising a liquid-impermeable enclosure.
Figure 19:
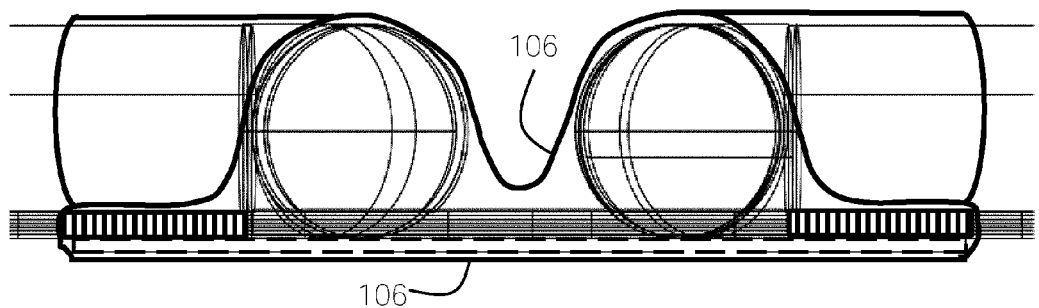
FIG. 19 shows a perspective cross-section view of the leak detector shown in FIG. 18 taken along line 19-19.
Figure 20:
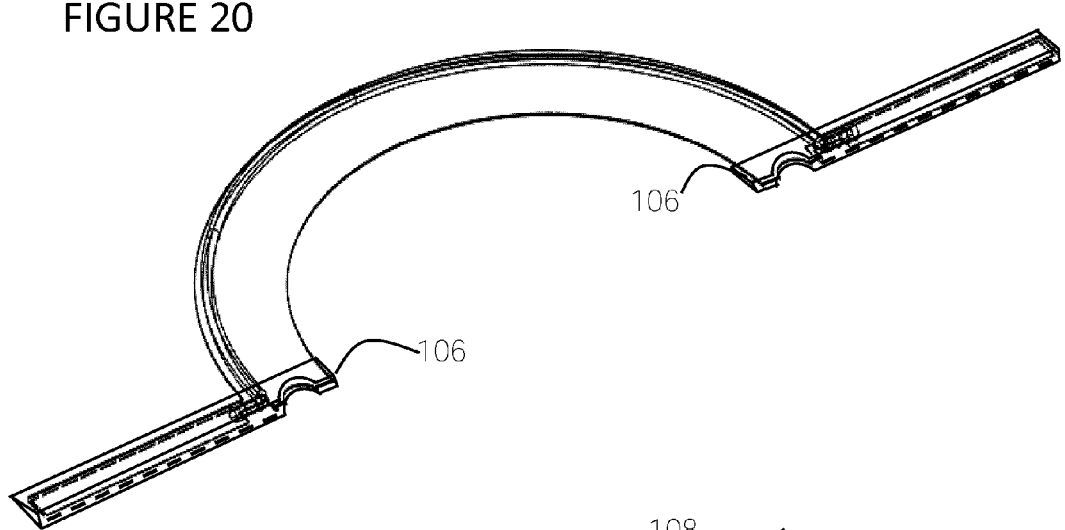
FIG. 20 shows a perspective cross-section view of the leak detector shown in FIG. 18 taken along line 20-20.
Figure 21:
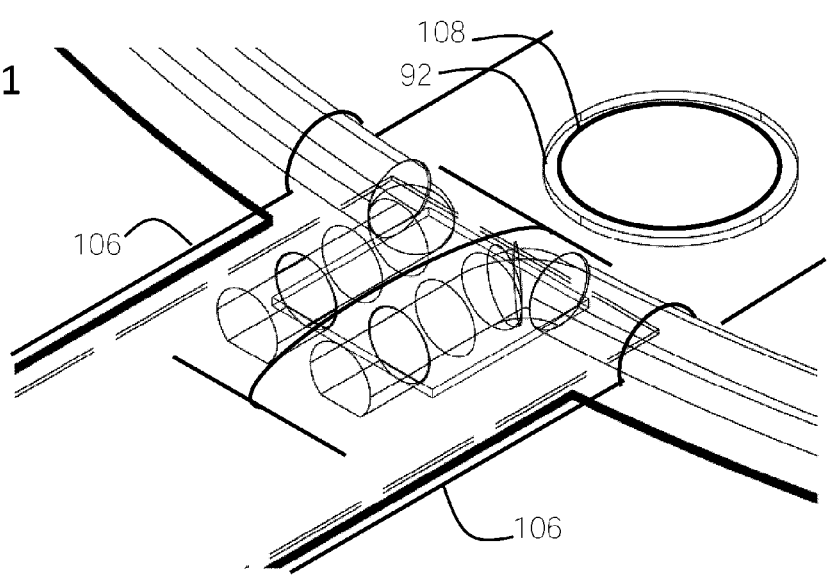
FIG. 21 shows a magnified perspective view of the region around line 19-19.

FIG. 15 shows a perspective cross-sectional view along line 15-15 shown in FIG. 14. FIG. 16 shows a perspective cross-sectional view along line 16-16 shown in FIG. 14. FIG. 17 shows a magnified perspective view of opening 102. FIGS. 15, 16 and 17 more clearly show the juxtaposition of wick material projections 96 and absorbent napkin 104 through opening 102 in projection tab 100.

FIGS. 18, 19, 20 and 21 are identical to FIGS. 14, 15, 16 and 17, respectively except for the addition of water-impermeable material 106 that surrounds and forms a water-impermeable enclosure containing wick material projections 96, projection tab 100 and absorbent napkin 104. The water-impermeable material 106 also partially covers second and third apertures 90 and 92. The water-impermeable material creates a seal around the perimeter of second and third apertures 90 and 92, and defines bolt openings 108 that have a smaller diameter than the second and third apertures 90 and 92. The bolt openings 108 are sized relative to the bolt diameter and receive bolts with a liquid-impermeable seal.

In operation, the leak detector is installed in a pipe connection, as shown in FIG. 13, with an aperture coaxially aligned with the pipe and having an aperture area sized to concentrically receive the pipe, or a flange or a gasket used to facilitate the pipe connection.

When a leak occurs, liquid accumulates or beads on the base sheet and flows towards and contacts the wick material barrier that continuously surrounds the aperture except optionally for one or more gap regions defined by a pair of wick material projections extending radially outward from the wick material barrier or one or more gap regions independent of wick material projections. Each gap region is relatively short compared to the total distance of the perimeter of the wick material barrier. The length of each gap region associated with a junction of the wick material projection is typically less than 10% of the total distance of the perimeter of the wick material barrier. The length of each gap region not associated with a junction of the wick material projection is typically less than 5% of the total distance of the perimeter of the wick material barrier.

The continuous or substantially continuous path of the wick material barrier results in a high probability that liquid from a leak is captured by the wick material barrier. Furthermore, with respect to gap regions, since both the pair of wick material projections and the gap region defined therebetween are covered by and contained within a liquid-impermeable enclosure a liquid flow towards the gap region is blocked by the liquid-impermeable enclosure and diverted towards the portions of the wick material barrier that can take up the liquid.

Liquid taken up by a portion of the wick material barrier disperses sequentially through adjoining portions of the wick material barrier until a wick material projection is reached. When the wick material barrier remains continuous at the junction of a wick material projection (as shown for example in FIG. 1) continued liquid flow through the wick material barrier competes with liquid flow to the wick material projection. When the wick material barrier is interrupted by a gap region at the junction of a wick material projection (as shown for example in FIG. 5) liquid flows primarily to the wick material projection.

The liquid-impermeable enclosure defines an interior cavity that contains the wick material projection and a reserve volume capacity for receiving liquid flowing from the wick material projection. Typically, the liquid-impermeable enclosure is made of transparent or semi-transparent material for ease of visual inspection of the reserve volume capacity. Liquid flowing from the wick material projections may accumulate in the reserve volume capacity and be observed by visual inspection. The interior cavity of the liquid-impermeable enclosure may also contain an absorbent material that has a greater absorbent rate than the wick material. The wick material projection abuts and is in fluid communication with the absorbent material allowing the absorbent material to draw off liquid from the wick material projection. The interior cavity of the liquid-impermeable enclosure may also contain a liquid sensor in fluid communication with the wick material projection and/or the absorbent material. The liquid sensor changes from a first state to a second state upon exposure to a target liquid. The interior cavity of the liquid-impermeable enclosure may also contain a projection tab extending radially outward from the base sheet. The projection tab may be used to provide abuttive support for the absorbent material or liquid sensor or to be a substrate for the absorbent material or liquid sensor.

The leak detector can be used with pipe connections that are visually obstructed by surrounding or covering structures. The leak detector used in this manner, can have a liquid-impermeable enclosure of sufficient length to extend from the base sheet of the leak detector to an outside edge of the covering structure. Additionally, the wick material projection, the absorbent material, the liquid sensor, the reserve volume capacity, the projection tab or any combination thereof will typically have sufficient length to reach the outside edge of the covering structure.

Figure 22:
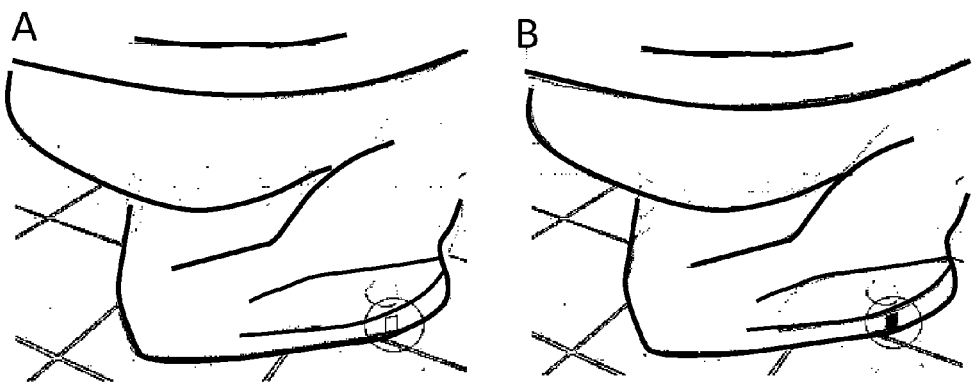
FIG. 22 shows the leak detector shown in FIG. 18 installed in a toilet drain pipe connection with an end potion of the liquid-impermeable enclosure attached to an outer surface of the base of the toilet with a liquid sensor having (A) a resting first state and (B) an activated second state.
Figure 23:
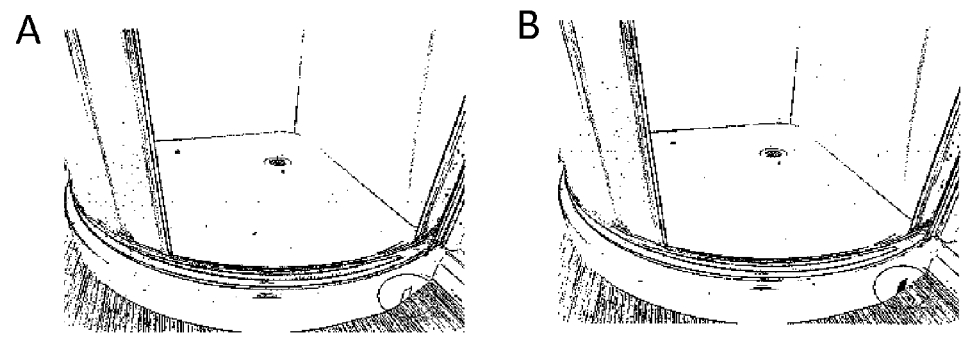
FIG. 23 shows a variant of the leak detector shown in FIG. 18 installed in a standing shower drain pipe connection with an end potion of the liquid-impermeable enclosure attached to an outer surface of the base of the standing shower with a liquid sensor having (A) a resting first state and (B) an activated second state.
Figure 24:
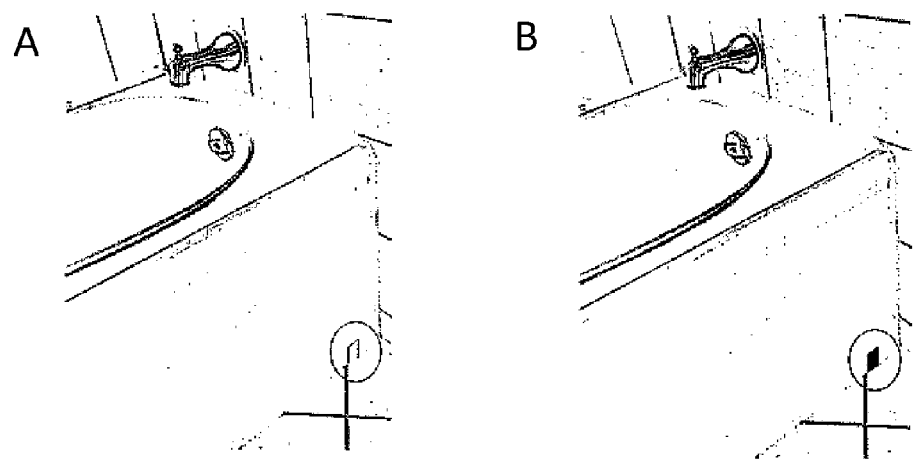
FIG. 24 shows another variant of the leak detector shown in FIG. 18 installed in a bath tub drain pipe connection with an end potion of the liquid-impermeable enclosure attached to an outer surface of the base of the bath tub with a liquid sensor having (A) a resting first state and (B) an activated second state.

An adhesive can be applied to the outer surface of an end portion of the liquid-impermeable enclosure and used to couple, typically reversibly, the end portion 110 of the liquid-impermeable enclosure to an outer surface of the covering structure as shown for example in FIG. 22, 23 or 24. A liquid sensor is also provided within the interior cavity defined by the end portion 110 of the water-impermeable enclosure. The liquid sensor may be observed by visual inspection as the water-impermeable enclosure is composed of a non-opaque material. FIGS. 22A, 23A, and 24A show the liquid sensor in a dry state showing a first color (white). FIGS. 22B, 23B, and 24B show the liquid sensor in a wet state after exposure to a liquid indicating a second color (black).

When in use the leak detector described herein displays two functional properties, leaked liquid channeling and exogenous liquid isolation.

A leaked liquid is captured by the wick material barrier and channeled through the wick material barrier to a wick material projection. The channeling may be enhanced by placing a gap region in the wick material barrier at its junction with a wick material projection. Channeling may also be enhanced by fluid communication between the wick material projection and the absorbent material. Channeling may also be enhanced by a series of ribs in between the aperture and the wick material barrier, the ribs extending in a radial direction defined by the aperture. The ribs reduce the surface area for accumulation of leaked liquid and force leaked liquid to flow into the troughs in between ribs and flow to the wick material barrier. Channeling may also be enhanced by a slope in the base sheet in between the aperture and the wick material barrier. The base sheet may be tapered so that the thickness of the base sheet decreases in a radial direction of the aperture in between the aperture and the wick material barrier. Channeling may also be enhanced by contacting the entire length of the wick material projection with a water-impermeable material.

An exogenous liquid is isolated from the channeling structures by surrounding the wick material projection, the gap region, the absorbent material, the liquid sensor or any combination thereof with a liquid-impermeable material. Isolation may be enhanced by the base sheet comprising a layer of liquid-impermeable material. Isolation may also be enhanced by placing a liquid-impermeable barrier between the wick material barrier and the outer perimeter of the base sheet, the liquid-impermeable barrier surrounding the wick material barrier and extending from the base sheet surface in a generally perpendicular direction to the base sheet.

Examples of modification or variation of the leak detector have been described above. Further examples of modifications and variation are now provided.

The size and shape of each of the components in the leak detector can tolerate variation, and will depend on the size and shape of the components of a pipe connection, typically the pipe, the flange, the gasket or any combination thereof and may also depend on the shape and size of a covering structure.

The choice of wick material can tolerate variation. Any material that can take up liquid and provide pores for the liquid to flow through capillary action may be used. Typically, sponges, foams and fabrics may be useful. The fabric may be woven or non-woven and may be natural or synthetic. Felt is an example of a synthetic non-woven fabric. Rayon felt, polyethylene felt or polypropylene felt are popular examples of felt. Further examples of useful materials may be selected from wool, cotton, sponge, polymers (eg. polyvinyl alcohol, polyvinylacetate, polyethylene, polypropylene), hemp, paper, bamboo, microfiber, wood or cork.

Examples of variants for the wick material barrier include a continuous or substantially continuous wick material barrier. A substantially continuous wick material barrier defines one or more gap regions. Gap regions may be associated with a junction of the wick material barrier with the wick material projection, with such gap regions typically having a length less than 10%, 9%, 8%, 7%, 6%, 5%, 4%, 3%, 2% or less than any percentage therebetween of the total distance of the perimeter of the wick material barrier. Where the gap region is associated with a pair of wick material projections, the gap region is maintained along the entire length of the pair of wick material projections, in that the pair of wick material projections do not abut each other at any point. Gap regions may also be independent of the wick material projection, where the purpose of the gap region is to divide the wick material barrier into sectors, with such gap regions typically having a length less than 5%, 4%, 3%, 2%, 1%, 0.5% or less than any percentage therebetween of the total distance of the perimeter of the wick material barrier.

The first aperture size and shape may be varied according to the application of the leak detector. The size and shape of the first aperture is related to one or more structures in a pipe connection, typically a pipe, a flange or a gasket. The first aperture size and shape will typically be approximately equal to the perimeter of the outer surface of the pipe, but in certain applications the first aperture size and shape may depend on the size and shape of the gasket and/or the flange.

The choice of base sheet material can also tolerate variation. The base sheet material may be plastic, elastomer, rubber, paper, metal and the like. The base sheet material is characterized by an absorbent rate and/or wicking capacity less than the absorbent rate or wicking capacity of the wick material. The thickness of the base sheet will typically range from 0.1 to 3 mm for most residential piping connections. However, the thickness may be greater for large piping applications, such as industrial or public infrastructure piping. The base sheet may be of any convenient shape and will depend on the shape of the piping connection and any coverings or structures causing visual obstruction.

The choice of the absorbent material can also tolerate variation. The absorbent material is characterized by an absorbent rate and/or wicking capacity greater than the absorbent rate or wicking capacity of the wick material. Absorbent materials may be selected from the same groups of materials that wick materials are chosen from. Many examples of absorbent materials may be found in the tissue paper, paper towel, baby diaper and feminine napkin industries as materials used in these devices are developed to quickly absorb and disperse liquid.

Assays to determine absorbent rate and wicking capacity are known. For example, U.S. Pat. No. 5,830,558 describes such an assay. The absorbent rate is a measure of the rate at which a material sample acquires liquid by wicking. The wicking capacity is a measure of the weight of water wicked into a material sample per gram of sample dry weight. The absorbent rate and wicking capacity may be measured using the following procedure. The sample sheet, which is cut into a circular shape having a 3 inch diameter, is supported horizontally on a tared filament tray. The weight of the dry sample is determined.

A vertical tube having a diameter of 0.312 inches and holding a column of liquid is provided. The tube is supplied with liquid from a reservoir to provide a convex meniscus adjacent the lip of the tube. The liquid level in the tube is adjustable, such as by a pump, so that the meniscus can be raised to contact a sample sheet positioned above the lip of the tube.

The sample sheet supported in the filament tray is positioned above the vertical tube, such that the filament tray is about ⅛ inch above the lip of the tube. The liquid level in the tube is then varied so that the meniscus contacts the sample, after which the pressure used to raise the meniscus (about 2 psi when the liquid is water) is reduced to zero. The weight of the sample sheet is monitored as water is taken up by the sample. Time zero is set at the instant when the sample first takes up liquid (first change in balance reading from dry weight). At time equals two seconds (two seconds after time zero), the contact between the meniscus and the sample sheet is broken by suction (about 2 psi when the liquid is water) applied to the liquid in the tube, and the wetted sample weight is recorded. The wetted sample is weighed after breaking contact between the meniscus and the sample so as not to include surface tension in the weight measurement.

The absorbent rate is the weight of the wetted sample minus the sample dry weight, divided by 2 seconds. A small positive pressure (about 2 psi when the liquid is water) is applied to the liquid in the tube to cause the meniscus to recontact the sample. The weight of the sample is again monitored until time equals 180 seconds. At time equals 180 seconds, the contact between the meniscus and the sample sheet is broken by suction (about 2 psi when the liquid is water) applied to the liquid in the tube, and the wetted sample weight is again recorded. The wetted sample is weighed after breaking contact between the meniscus and the sample so as not to include surface tension in the weight measurement. The wicking capacity is calculated as the wetted sample weight at 180 seconds minus the dry weight, divided by the dry weight. The absorbent capacity and wicking capacity are each reported as an average of at least 4 measurements.

Many different liquid sensors may be incorporated in the leak detector. The liquid sensor can be, for example, a color-changing paper similar to litmus paper or other pH sensitive paper, a paper with a liquid diffusible dye, or an electronic sensor configured to emit a visible and/or audible signal when the electronic sensor detects a liquid. The liquid sensor can produce and/or transmit any suitable signal (either wirelessly or via a connection wire) in response to the detection of a leak. For example, the liquid sensor (and/or a receiving circuit disposed outside of the toilet base) can produce a signal associate with an audible alarm. In another example, the liquid sensor (and/or a receiving circuit disposed outside of the toilet base) can produce a signal that is received by a wireless device (e.g., a text message, an electronic page, an e-mail or the like) or a signal that is received by a monitoring service (e.g., a home alarm monitoring service). Further examples of liquid sensors may be found in US Patent Publication No 2011/0209278.

The choice of liquid-impermeable material used in any one of the liquid-impermeable enclosure, liquid-impermeable barrier or liquid-impermeable layer of the base sheet may also tolerate variation. The liquid-impermeable material can be a single film layer, a laminate or multilayer film. The liquid-impermeable material may comprise a layer of film comprising, for example a polymer selected from polymers in the group consisting of: polyamides; ethylene vinyl alcohol copolymers; polyvinylidene chloride; and polyolefins.

The liquid-impermeable layer can optionally comprise an adhesive layer which is useful as a tie layer between two non-compatible layers in a laminate. The adhesive layer (tie layer) can comprise anhydride-modified ethylene homopolymers and/or anhydride-modified ethylene copolymers. Examples of a multilayer liquid-impermeable material include, from outermost layer to innermost layer: polyethylene/tie layer/polyamide; polyethylene/tie layer/polyamide/tie layer/polyethylene; polypropylene/tie layer/polyamide/EVOH/polyamide; polyamide/tie layer/polyethylene; polyamide/tie layer/polyethylene/tie layer/polyamide; polyamide/tielayer/polyamide/EVOH/polyamide.

Examples of suitable polyamides suitable include aliphatic polyamides, amorphous polyamides, or mixtures thereof. Other suitable polyamides may be found in U.S. Pat. Nos. 5,408,000; 4,174,358; 3,393,210; 2,512,606; 2,312,966 and 2,241,322.

Examples of suitable polyolefins suitable include polypropylenes, polyethylene polymers and copolymers. Polyethylenes can be prepared by a variety of methods, including well-known Ziegler-Natta catalyst polymerization (see for example U.S. Pat. No. 4,076,698 and U.S. Pat. No. 3,645,992), metallocene catalyst polymerization (see for example U.S. Pat. No. 5,198,401 and U.S. Pat. No. 5,405,922) and by free radical polymerization. Polyethylene polymers can include linear polyethylenes such as high density polyethylene (HDPE), linear low density polyethylene (LLDPE), very low or ultralow density polyethylenes (VLDPE or ULDPE) and branched polyethylenes such as low density polyethylene (LDPE). The liquid-impermeable material can comprise ethylene copolymers such as ethylene vinyl esters, ethylene alkyl acrylates, ethylene acid dipolymers, or ethylene acid terpolymers. Examples of such ethylene copolymers are ethylene vinyl acetate, ethylene methyl acrylate and ethylene(meth)acrylic acid polymers. Examples of polypropylene polymers include propylene homopolymers, impact modified polypropylene and copolymers of propylene and alpha-olefins and their blends.

The liquid-impermeable material can additionally comprise optional materials, such as the conventional additives used in polymer films including: plasticizers, stabilizers, antioxidants, ultraviolet ray absorbers, hydrolytic stabilizers, anti-static agents, dyes or pigments, fillers, fire-retardants, lubricants, reinforcing agents such as glass fiber and flakes, processing aids, antiblock agents, release agents, and/or mixtures thereof.

Further variations, modifications and combinations will be apparent to the person of skill in the art.

What is claimed is:

1. A leak detector for installation between a gasket and a flange of a flanged drain pipe connection of a wastewater plumbing fixture comprising:
 a flat base sheet bound by opposing first and second surfaces and an outer perimeter, the base sheet defining an aperture sized to be approximately equal to a radial cross-sectional area of the drain pipe;
 a wick material barrier coupled to the base between the aperture and the outer perimeter in a substantially continuous strip around the aperture, the wick material barrier interrupted by one or more gap regions, each gap region defined by a pair of wick material ends;

a liquid sensor in fluid communication with at least one pair of wick material ends; and a water-impermeable material coupled to the base sheet and surrounding the at least one pair of wick material ends to form a water-impermeable enclosure defining an interior cavity comprising the at least one pair of wick material ends and the liquid sensor.

2. The leak detector of claim 1, further comprising a second aperture sized to receive a bolt used to secure an outlet of the wastewater plumbing fixture to the flange.

3. The leak detector of claim 1, further comprising an adhesive strip disposed on an outer surface of the water-impermeable enclosure.

4. The leak detector of claim 1, further comprising a water-absorbent material in fluid communication with the pair of wick material projections within the interior cavity of the water-impermeable enclosure.

5. The leak detector of claim 4, wherein the absorbent rate of the water-absorbent material is greater than the absorbent rate of the wick material projections.

6. The leak detector of claim 1, wherein the length of each gap region is less than 5% of the total distance of the perimeter of the wick material barrier.

7. The leak detector of claim 1, further comprising a water-impermeable barrier disposed between the wick material and the outer perimeter, the barrier extending perpendicular to the base sheet surface.

8. A leak detector for installation between a gasket and a flange of a flanged drain pipe connection of a wastewater plumbing fixture comprising:

a flat base sheet bound by opposing first and second surfaces and an outer perimeter, the base defining an aperture sized to be approximately equal to the radial cross-sectional area of the drain pipe;

a wick material barrier coupled to the base between the aperture and the outer perimeter in a substantially continuous strip around the aperture;

a wick material projection extending radially outward from the wick material barrier;

an absorbent material in fluid communication with the wick material projection, the absorbent material having an absorbent rate greater than the absorbent rate of the wick material projection; and a water-impermeable material coupled to the base sheet and surrounding the wick material projection to form a water-impermeable enclosure defining an interior cavity comprising the wick material projection and the absorbent material.

9. The leak detector of claim 8, further comprising a second aperture sized to receive a bolt used to secure an outlet of the wastewater plumbing fixture to the flange.

10. The leak detector of claim 8, further comprising an adhesive strip disposed on an outer surface of the water-impermeable enclosure.

11. The leak detector of claim 8, further comprising a liquid sensor in fluid communication with the absorbent material within the interior cavity of the water-impermeable enclosure.

12. The leak detector of claim 8, wherein the wick material barrier is interrupted by one or more gap regions.

13. The leak detector of claim 12, wherein the length of each gap region is less than 5% of the total distance of the perimeter of the wick material barrier.

14. The leak detector of claim 8, further comprising a water-impermeable barrier disposed between the wick material and the outer perimeter, the barrier extending perpendicular to the base sheet surface.

15. A leak detector comprising:

a flat base sheet bound by an outer perimeter and an interior aperture;

a wick material barrier coupled to the base between the aperture and the outer perimeter in a continuous or substantially continuous strip around the aperture, the wick material barrier interrupted by one or more gap regions, each gap region defined by a pair of wick material projections starting at either end of the gap region and extending radially outward;

a liquid sensor in fluid communication with the pair of wick material projections; and a liquid-impermeable material coupled to the base sheet and surrounding the pair of wick material projections to form a liquid-impermeable enclosure defining an interior cavity comprising the pair of wick material projections and the liquid sensor.

16. The leak detector of claim 15, further comprising a second aperture sized to receive a bolt used to secure a pipe connection.

17. The leak detector of claim 15, further comprising an adhesive strip disposed on an outer surface of the liquid-impermeable enclosure.

18. The leak detector of claim 15, further comprising an absorbent material in fluid communication with the pair of wick material projections within the interior cavity of the liquid-impermeable enclosure.

19. The leak detector of claim 18, wherein the absorbent rate of the absorbent material is greater than the absorbent rate of the wick material projections.

20. The leak detector of claim 15, wherein the length of each gap region is less than 5% of the total distance of the perimeter of the wick material barrier.

21. The leak detector of claim 15, further comprising a liquid-impermeable barrier disposed between the wick material and the outer perimeter, the barrier extending perpendicular to the base sheet surface.

* * * * *